Jan. 31, 1956     R. W. THOMPSON     2,732,642
MAP HOLDER
Filed May 6, 1952
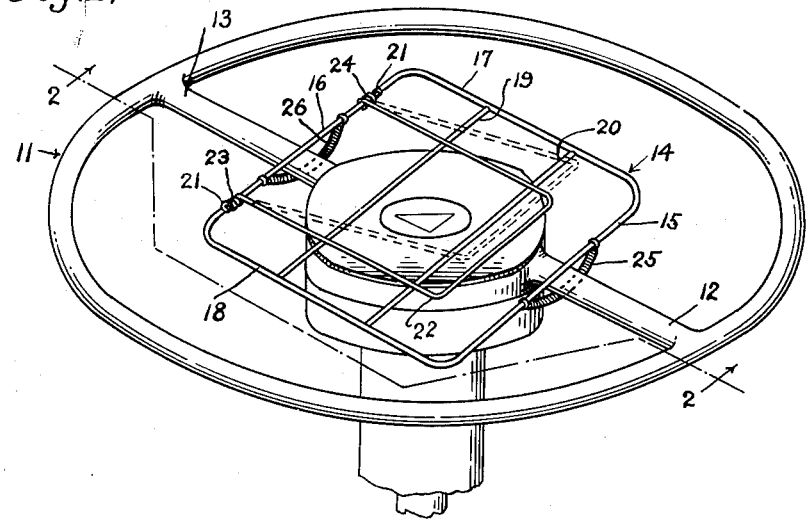
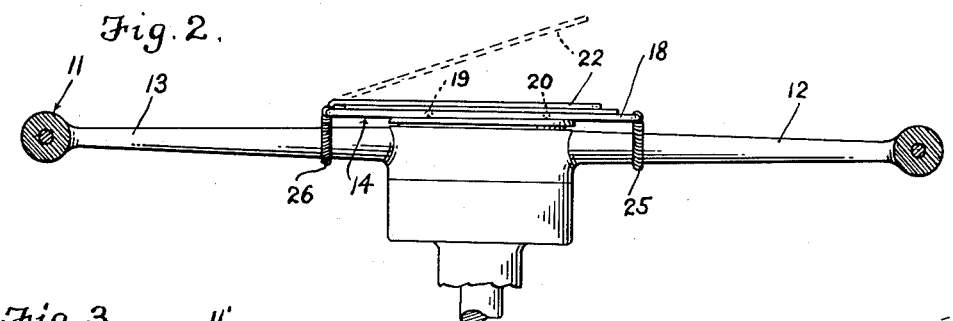
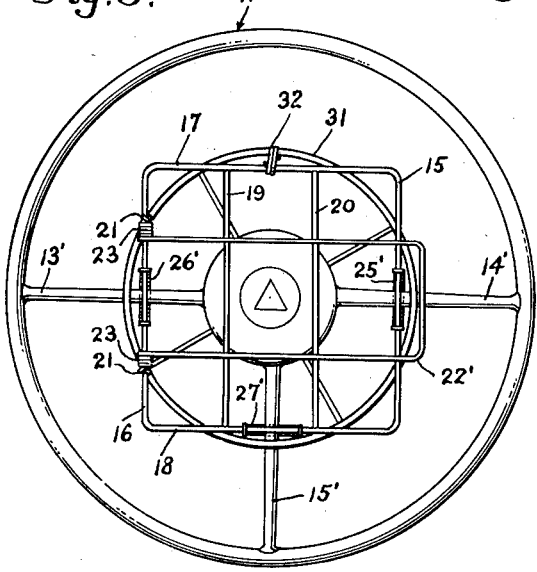
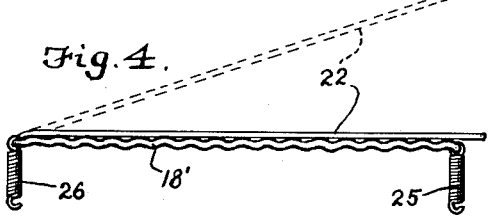
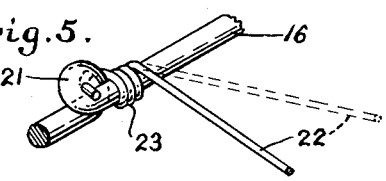
INVENTOR.
Richard W. Thompson
BY
McMorrow, Berman & Davidson
Attorneys.

United States Patent Office 2,732,642
Patented Jan. 31, 1956

2,732,642
MAP HOLDER
Richard W. Thompson, Detroit, Mich.
Application May 6, 1952, Serial No. 286,394
1 Claim. (Cl. 40—13)

This invention relates to map holding devices for motor vehicles, and more particularly to an improved steering wheel-mounted map holder.

The main object of the invention is to provide a novel and improved map holder for motor vehicles which can be mounted on a steering wheel, said map holder being simple in construction, being easy to install, and providing a means of holding a road map or the like in a readily visible position so that the driver of the motor vehicle may be able to see the map without interfering with his normal view of the roadway in front of the vehicle or with his view of the instrument panel.

A further object of the invention is to provide an improved map holder which may be mounted on the steering wheel of a motor vehicle, said map holder being inexpensive to manufacture, being sturdy in construction, and conforming with steering wheels of different shapes and sizes so that it may be used on a wide range of motor vehicles.

Further objects and advantages of the invention will become apparent from the following description and claim, and from the accompanying drawings, wherein:

Figure 1 is a perspective view of a steering wheel provided with an improved map holder constructed in accordance with the present invention.

Figure 2 is a cross sectional view taken on the line 2—2 of Figure 1.

Figure 3 is a top plan view of a map holder according to the present invention, shown mounted on a steering wheel of the type provided with a horn-operating ring.

Figure 4 is an enlarged side elevational view of a further modified form of map holder constructed in accordance with the present invention.

Figure 5 is an enlarged perspective detail view of a portion of one of the side arms of the map holder employed in any one of the forms of the invention shown in Figures 1 to 4, illustrating the manner of connecting an end of the clamping element of the map holder to said side arm.

Referring to the drawings, and more particularly to Figures 1 and 2, 11 designates a conventional steering wheel of the type having diametrically opposed radial spokes 12 and 13. Designated generally at 14 is an improved map holder according to the present invention, said map holder comprising a rectangular wire frame having side bars 15 and 16 and end bars 17 and 18 integral with each other, the frame being preferably made of a single piece of relatively stiff wire. Designated at 19 and 20 are respective cross bars of suitable stiff wire which are secured to the end bars 17 and 18 and extend across the frame in spaced relationship between the side bars to form with the side and end bars a support designated generally 14. The side bar 16 of the frame is formed adjacent its opposite ends with the upstanding loop portions 21, 21, and designated at 22 is a U-shaped wire clamping member having spaced legs carrying coiled ends 23 and 24 which encircle the side bar 16 adjacent the loops 21, 21. The ends of the coils 23 and 24 adjacent the loops 21, 21 extend outwardly from the coils and are thrust through adjacent loops 21, 21 as in Figure 5 to prevent rotation of the coils about the side bar 16. The coils 23 and 24 provide a resilient biasing action on the clamping member 22, urging said clamping member downwardly toward the support 14, as shown in Figure 1, whereby a map may be secured between the clamping member 22 and the support 14.

Designated at 25 and 26 are respective coil springs which are engageable beneath the spokes 12 and 13 of the steering wheel and which may have their ends secured to the respective frame elements 15 and 16 in the manner shown in Figure 1, whereby the map holder 14 is secured on the steering wheel 11 above the hub thereof. To mount the map holder on the steering wheel, it is therefore merely necessary to engage the springs 25 and 26 beneath the spokes 12 and 13, each spring preferably having at least one hooked end which is detachable from the map holder frame, and which may be again hooked over the associated marginal element of the frame after the spring has been passed beneath a spoke of the steering wheel.

As shown in Figure 2 in dotted view, the clamping member 22 may be elevated to release a map positioned therebeneath, for the insertion of a new map, or any other information sheet which the driver may wish to observe during his journey.

As shown in Figure 3, the map holder may be employed on a steering wheel 11' provided with a horn ring 31, by the provision of a spring clip 32 which may be utilized to secure the frame element 17 of the map holder to the ring 31. In the form of the invention shown in Figure 3, the steering wheel 11' is provided with three spokes, shown at 13', 14' and 15', and respective securing springs 25', 26' and 27' are employed on the respective frame elements 15, 18 and 16 to secure the map holding frame to said spokes. As further shown in Figure 3, the map holder may include a clamping frame, shown at 22' of a length sufficient to extend outwardly beyond the side bar 15, whereby a relatively large map or sheet may be secured in the holder.

As further shown in Figure 4, the frame of the map holder may be provided with sinuously formed side and end bars, such as shown at 18' in Figure 4, to improve the frictional gripping effect provided when the clamping arm of the holder grippingly engages a map or information sheet positioned between the clamping arm and the support and to prevent slipping of the ends of springs 25 and 26 which may be engaged therewith.

While certain specific embodiments of an improved map holder for use on the steering wheel of a motor vehicle have been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A map holder for attachment to a vehicle steering wheel comprising a frame having spaced sinuous side bars and spaced sinuous end bars, cross bars carried by the end bars and extending across the frame between the end bars to form with said frame a support, extensible members attached to selected sinuous bars for extension around the spokes of a steering wheel, a hook carried by each extensible member for engagement with the sinuous bar to which it is attached after its extension around a spoke, and a substantially U-shaped clamp carried by a side bar and yieldingly urged toward the support for engaging a sheet extending across the support and holding it in contact with the sinuous bars of the support.

References Cited in the file of this patent

UNITED STATES PATENTS

| | | |
|---|---|---|
| 263,685 | Clark | Sept. 5, 1882 |
| 1,117,478 | Brown | Nov. 17, 1914 |
| 1,733,293 | Brow | Oct. 29, 1929 |
| 1,764,558 | Ginsberg | June 17, 1930 |
| 1,840,022 | Cobbs | Jan. 5, 1932 |
| 2,176,708 | Douglas | Oct. 17, 1939 |